(12) United States Patent
Matan et al.

(10) Patent No.: US 8,655,969 B2
(45) Date of Patent: Feb. 18, 2014

(54) STATISTICS REPORTING IN A NETWORK TEST SYSTEM

(75) Inventors: Flaviu Matan, Bucharest (RO); Marian Gheorghe, Bucharest (RO); Alex Tatar, Bucharest (RO)

(73) Assignee: Ixia, Calabasas, CA (US)

( * ) Notice: Subject to any disclaimer, the term of this patent is extended or adjusted under 35 U.S.C. 154(b) by 134 days.

(21) Appl. No.: 13/486,969

(22) Filed: Jun. 1, 2012

(65) Prior Publication Data

US 2013/0325974 A1    Dec. 5, 2013

(51) Int. Cl.
*G06F 15/173* (2006.01)

(52) U.S. Cl.
USPC .......... 709/206; 709/223; 709/224; 709/225; 370/250; 370/252

(58) Field of Classification Search
USPC .......... 709/206, 223–226; 455/436; 370/250, 370/252
See application file for complete search history.

(56) References Cited

U.S. PATENT DOCUMENTS

| | | | |
|---|---|---|---|
| 6,321,264 B1 | 11/2001 | Fletcher | |
| 6,717,917 B1 | 4/2004 | Weissberger et al. | |
| 6,826,259 B2 | 11/2004 | Hoffman | |
| 7,187,683 B1 | 3/2007 | Sandoval et al. | |
| 7,461,145 B2 * | 12/2008 | Hirschman et al. | 709/223 |
| 7,826,377 B2 | 11/2010 | Pepper | |
| 7,840,664 B2 * | 11/2010 | Dugatkin et al. | 709/224 |
| 8,310,942 B2 * | 11/2012 | Gintis et al. | 370/250 |
| 8,391,157 B2 * | 3/2013 | Ginsberg et al. | 709/224 |
| 8,593,990 B1 * | 11/2013 | Henttonen et al. | 370/252 |
| 2002/0183969 A1 | 12/2002 | Hanes et al. | |
| 2004/0236866 A1 | 11/2004 | Dugatkin et al. | |
| 2007/0100997 A1 * | 5/2007 | Hirschman et al. | 709/224 |
| 2008/0117907 A1 | 5/2008 | Hein | |
| 2009/0005029 A1 * | 1/2009 | Wang et al. | 455/423 |
| 2009/0086651 A1 * | 4/2009 | Luft et al. | 370/253 |
| 2011/0182191 A1 * | 7/2011 | Jackson | 370/250 |
| 2011/0300871 A1 * | 12/2011 | Dottling et al. | 455/446 |
| 2012/0015657 A1 * | 1/2012 | Comsa et al. | 455/436 |
| 2013/0073336 A1 * | 3/2013 | Heath | 705/7.29 |
| 2013/0179669 A1 * | 7/2013 | Song et al. | 713/2 |

* cited by examiner

*Primary Examiner* — Ramy M Osman
(74) *Attorney, Agent, or Firm* — SoCal IP Law Group LLP; John E. Gunther; Steven C. Sereboff (57) ABSTRACT

A report manager for a network test system. At least one present statistic load count may be maintained, the present statistics load count representing a cumulative number of statistics required to generate one or more reports in near-real time. A report request may be received from a user. An incremental statistics load associated with the report request may be determined. A decision whether or not the report request can be fulfilled may be made based on the at least one present statistics load count and the incremental statistic load. When the report cannot be fulfilled, a message denying the report request may be provided to the user. When the report request can be fulfilled, the incremental statistics load may be added to the present statistics load count and the report request may be fulfilled.

9 Claims, 6 Drawing Sheets

STATISTICS REPORTING IN A NETWORK TEST SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to network test systems that report test statistics in near-real time during network test sessions.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, 3, 4, and 7 of the structure are the physical layer, the data link layer, the network layer, the transport layer, and the application layer, respectively.

Layer 1, or physical layer, protocols define the physical (electrical, optical, or wireless) media between nodes of the network and the rules and processes used to access that media. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode, Frame Relay, Point to Point Protocol, Layer 2 Tunneling Protocol, Fiber Distributed Data Interface, Synchronous Data Link Control, High-Level Data Link Control, Integrated Services Digital Network, Token Ring, various wireless protocols, various Ethernet and Fibre Channel protocols, and other protocols.

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of layer 2 protocols. At least some of the nodes of the network may include a router that extracts a destination address from a network layer header contained within each packet. The router then uses the destination address to determine the route or path along which the packet should be retransmitted. A typical packet may pass through a plurality of routers, each of which repeats the actions of extracting the destination address and determining the route or path along which the packet should be retransmitted.

Layer 4 protocols govern end-to-end message delivery in a network. In particular, the Transmission Control Protocol (TCP) provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed unilaterally by one of the devices. Opening and closing a connection both require several steps at which specific messages are exchanged between the two devices. A connection may also be closed when an anticipated response is not received by one device for a predetermined period of time, commonly called a "time-out". A TCP connection is considered to be "stateful" since each device must maintain information describing the state of the connection (being opened, established, being closed), what data has been sent, and what sent data has been acknowledged. The User Datagram Protocol (UDP) is an alternative layer 4 protocol that provides for delivery of packet streams. UDP connections are stateless and do not provide for reliable delivery.

Layer 7, or application layer, protocols include the HyperText Transfer Protocol (HTTP) used to convey HTML documents such as Web pages, and the Simple Mail Transfer Protocol (SMTP) and Post Office Protocol (POP3) used to convey electronic mail messages. Other layer 7 protocols include Simple Message System (SMS), File Transfer Protocol (FTP), Real Time Protocol (RTP), Real-time Transport Control Protocol (RTCP), Real Time Streaming Protocol (RTSP), Media Gateway Control Protocol (MEGACO), Session Initiation Protocol (SIP), and other protocols used to transfer data, voice, video, and network control information over a network.

In this patent, the term "network under test" (NUT) encompasses all or a portion of a packet switched communications network or one or more network devices within, or for use in, a packet switched communications network. In order to test a NUT, test traffic comprising a large number of packets may be generated and transmitted to and/or through the NUT at one or more ports. Return test traffic transmitted through and/or from the NUT may be received at different ports. The received test traffic may be analyzed to measure the performance of the NUT. In this context, the term "port" refers to a logical entity coupled to the NUT by a communications path. The term "port unit" refers to a module within the network test equipment that connects to the NUT at a port. Thus a "port" encompasses a physical "port unit" and the data and parameters that define and constraint the operation of the port unit during attest session. Each port connected to the NUT may be both a source of test traffic and a destination for test traffic. Each port may emulate a plurality of logical source or destination addresses. Each port may emulate a plurality of network users, clients, peers, servers, or other network devices.

The test traffic may depend on the type of network or device to be tested and the type of test to be performed. For example, when a NUT is a switch or router operating at layer 2 or layer 3 of the network structure, the test traffic may include a large plurality of IP packets apparently originating from a plurality of source IP addresses and destined for a plurality of destination IP addresses. In this case, the actual content of the IP packets may be unimportant. When the NUT operates at a higher layer of the network structure (for example, when the NUT is or includes a server, a server load balancer, a firewall, a network security device that performs packet inspection, or similar network devices), the test traffic may include or be a large plurality of TCP connections or a large plurality of application layer transactions (e.g. HTTP GET transactions).

A test of a complex network or network device may consist of very large number (e.g. 100,000) connections totaling an even larger number (e.g. millions) of packets exchanged between a hundred or more ports over an extended time period. Interim test results may be reported in near-real time during a test session. In this context, "near-real time" means delayed from real time by a time interval that is small compared to the overall test duration. Near-real time reports may be updated, for example, every few seconds.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
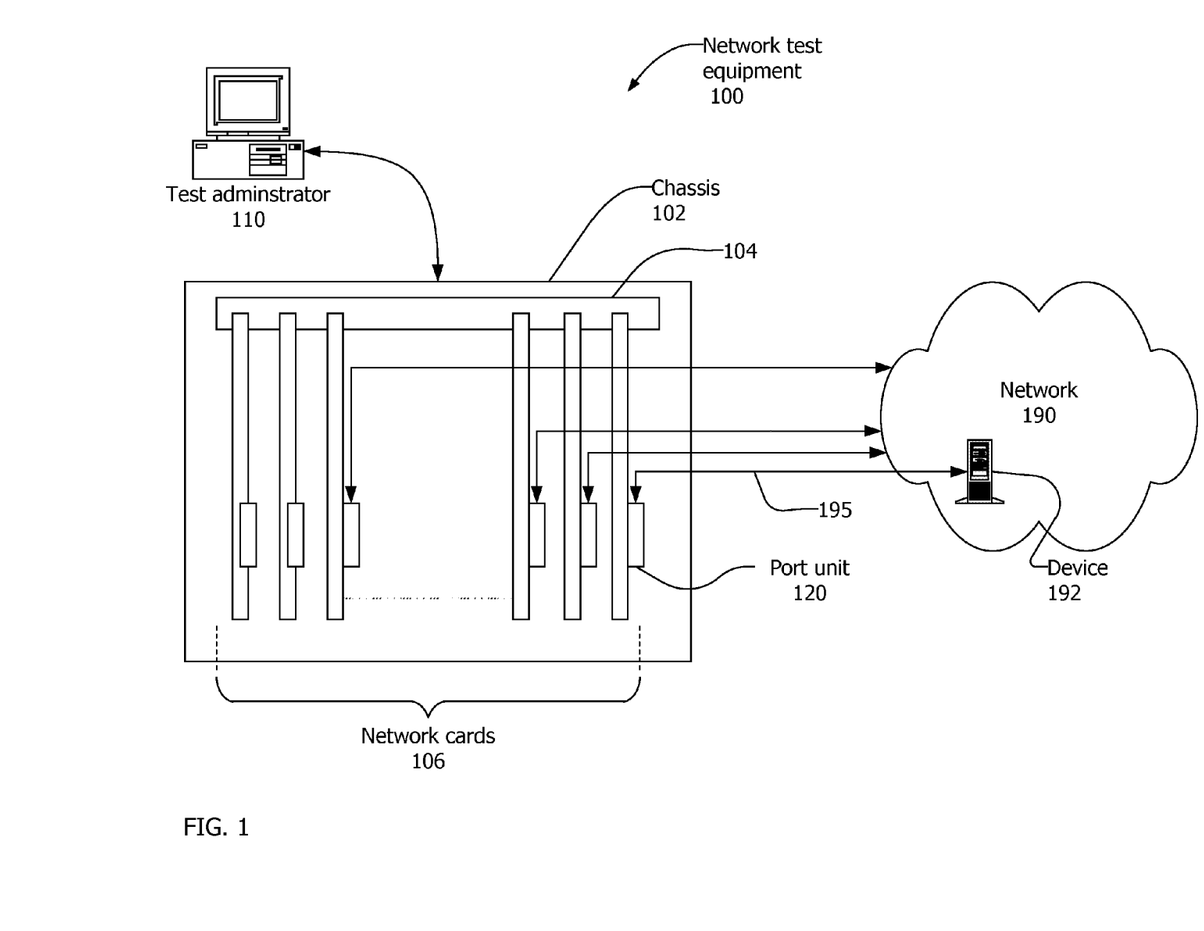
FIG. 1 is a block diagram of a network environment.

FIG. 1 shows a block diagram of a network environment. The environment may include network test equipment 100 and a network 190 which includes one or more network devices 192.

The network test equipment 100 may be a network testing device, performance analyzer, conformance validation system, network analyzer, or network management system. The network test equipment 100 may include one or more network cards 106 and a backplane 104 contained or enclosed within a chassis 102. The chassis 102 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The network cards 106 may include one or more field programmable gate arrays (FPGAs), application specific integrated circuits (ASICs), programmable logic devices (PLDs), programmable logic arrays (PLAs), processors, and other kinds of devices. In addition, the network cards 106 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 106 may support a single communications protocol, may support a number of related protocols, or may support a number of unrelated protocols. One or more network cards 106 or their equivalent may be permanently installed in a self-contained test unit or tests appliance.

Each network card 106 may contain one or more port unit 120. Each port unit 120 may include circuits and software to generate test traffic and/or to receive and analyze test traffic. Each port unit may be coupled to the test administrator 110 via the chassis 102. Each port unit 120 may connect to the network 190 through one or more ports. Each port unit 120 may be connected to the network 190 through a communication medium 195, which may be a wire, an optical fiber, a wireless link, or other communication medium.

The backplane 104 may serve as a bus or communications medium for the network cards 106. The backplane 104 may also provide power to the network cards 106.

The network test equipment 100 may also include a test administrator 110. The test administrator 110 may be a computing device included within or coupled to the chassis 102. The test administrator 110 may include an operator interface (not shown) that may be used to plan a test session, to control the test session, and/or to view test results during and after the test session. The operator interface may include, for example, a display and a keyboard, mouse, and/or other input devices (not shown). The test administrator 110 may include or be coupled to a printer or other data output device (not shown) for output of test results. The test administrator 110 may include or be coupled to a storage device (not shown) for storing test data and results for future review and/or analysis.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 192. The network itself may be comprised of numerous nodes providing numerous physical and logical paths for data to travel.

The one or more network devices 192 may be any devices capable of communicating over the network 190. The one or more network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, server load balancers (SLBs), and multiplexers. In addition, the one or more network devices 192 may include appliances, alarm systems, and any other device or system capable of communicating over a network. The network 190 may consist of a single network device 192 or a plurality of network devices interconnected by a plurality of communications paths, all of which will be referred to herein as the network under test (NUT).

Figure 2:
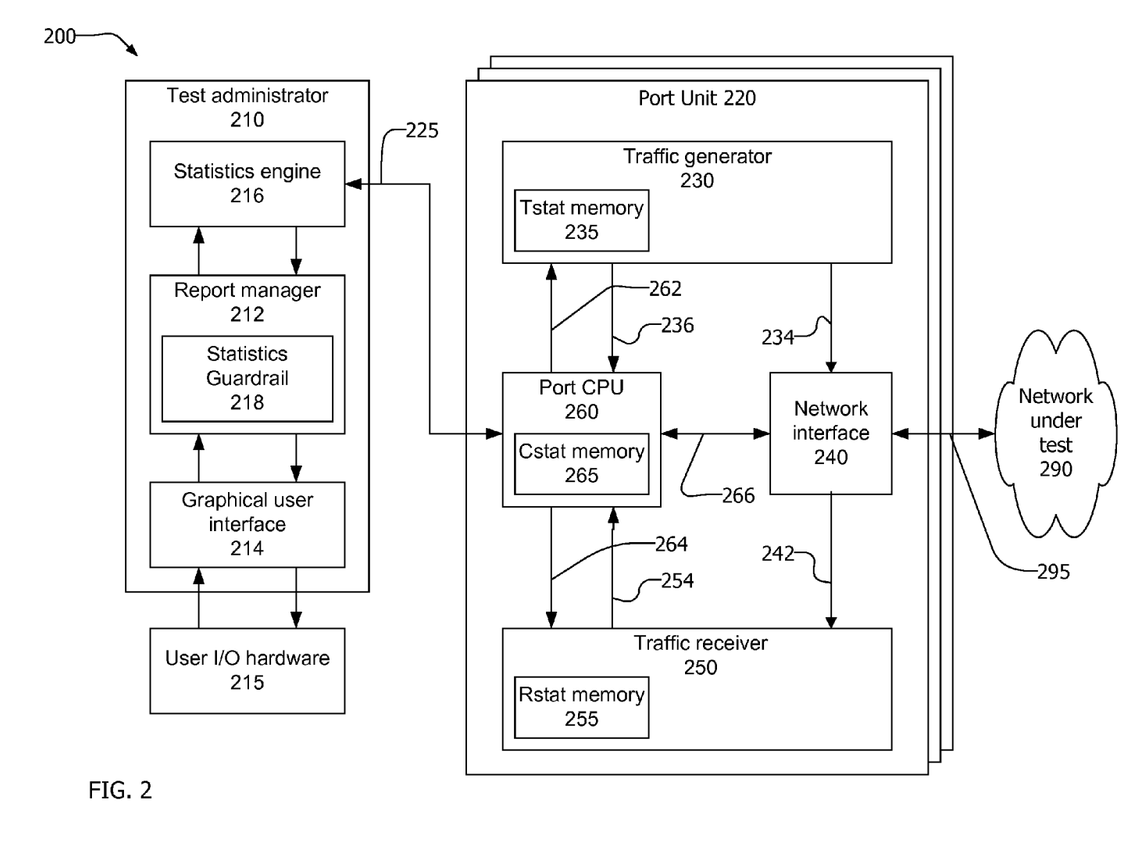
FIG. 2 is a block diagram of a test system.

Referring now to FIG. 2, a test system 200, which may be the network test equipment 100 may includes a test administrator 210 coupled to a plurality of port units including an exemplary port unit 220. The port unit 220 may include a port central processor unit 260 (CPU), a traffic generator unit 230, a traffic receiver unit 250, and a network interface unit 240 which couples the port unit 220 to a network under test 290. The port unit 220 may be all or part of a network card such as the network cards 106.

The port CPU 260 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port CPU 260 may provide the traffic generator unit 230 with stream forming data 262 to form a plurality of streams. The stream forming data 262 may include, for example, the type of packet, the frequency of transmission, definitions of fixed and variable-content fields within the packet and other information for each packet stream. The traffic generator unit 230 may then generate the plurality of streams in accordance with the stream forming data 262. The plurality of streams may be interleaved to form outgoing traffic 234. Each of the streams may include a sequence of packets. The packets within each stream may be of the same general type but may vary in length and content.

The traffic generator unit 230 may accumulate and store transmit statistics in a transmit statistics (Tstat) memory 235. In this context, "transmit statistics" are test statistics associated with packets transmitted by a port unit. The transmit statistics stored in the Tstat memory 235 may include, for example, some or all of a total number of packets transmitted, a number of packets transmitted for each protocol, and/or a number of packets transmitted for each address associated with the port unit 220.

The network interface unit 240 may convert the outgoing traffic 234 from the traffic generator unit 230 into the electrical, optical, or wireless signal format required to transmit the test traffic to the network under test 290 via a communications link 295. The communications link 295 may be a wire, an optical fiber, a wireless link, or other communication link. Similarly, the network interface unit 240 may receive electrical, optical, or wireless signals from the network over the communications link 295 and may convert the received signals into incoming traffic 242 in a format usable to the traffic receiver unit 250.

The traffic receiver unit 250 may receive the incoming traffic 242 from the network interface unit 240. The traffic receiver unit 250 may determine if each received packet is a member of a specific flow, and may accumulate receive statistics for each flow in accordance with test instructions 264 provided by the port CPU 260. In this context, "receive statistics" are test statistics associated with packets received by a port unit. The accumulated receive statistics may include, for example, a total number of received packets, a number of packets received out-of-sequence, a number of received packets with errors, a maximum, average, and minimum propagation delay, and other statistics for each flow. The accumulated received statistic may be stored in a receive statistics (Rstat) memory 255. The traffic receiver unit 250 may also capture and store specific packets in accordance with capture criteria included in the test instructions 264. The traffic receiver unit 250 may provide test statistics and/or captured packets 254 to the port CPU 260, in accordance with the test instructions 264, for additional analysis during, or subsequent to, the test session.

Some amount of interactive communications may be required between the port unit 220 and the network under test 290 during a test session. The interactive communications may include, for example, control-plane traffic, TCP connections and application-layer transactions. Such traffic may be initiated, managed, and processed by the port CPU 260 and thus may be referred to as "CPU traffic". As shown in FIG. 2, the port CPU 260 may be coupled to the network interface unit 240 such that CPU traffic 266 may be communicated between the port CPU 260 and the network under test 290 via the network interface unit 240. Although not shown in FIG. 2, outgoing CPU traffic may be routed from the Port CPU 260 to the network interface unit 240 via the traffic generator unit 230, and incoming CPU traffic may be routed from the network interface unit to the port CPU via the traffic receiver unit 250.

The CPU may accumulate and store CPU traffic statistics in a CPU traffic statistics (Cstat) memory 265. The CPU traffic statistics stored in the Cstat memory may include, protocol-specific statistics such as, for example, the number of TCP connections made and the number of TCP connections currently active.

The port CPU 260 may communicate with the test administrator 210. The test administrator 210 may be a computing device connected to the port unit 220 via a bus, a network, or another communications path. The test administrator may include or be coupled to user I/O hardware 215. The user I/O hardware 215 may include at least one display device and one or more input devices such as a keyboard, a mouse or other pointing device, a touch screen, and/or other device used to communicate with a test engineer or other user.

The hardware and software of the test administrator 210 may perform multiple functions including a report manager 212, a graphical user interface 214, and a statistics engine 216. The test administrator 210 may perform additional functions not shown in FIG. 2.

The report manager 212 may manage the generation of one or more reports including interim or final test results. The report manager 212 may receive, via the graphical user interface 214 and the user I/O hardware 215, user requests for specified test data be reported in near-real time. The report manager may parse each request to determine the data to be included in each report. The report manager 212 may register the data required for each report with the statistics engine 216.

The statistics engine 216 may determine exactly what transmit statistics, receive statistics, and CPU traffic statistics are required from each port unit to provide the data registered by the report manager 212. The statistics engine 216 may request and receive the required statistics from each port unit, and aggregate the received statistics to provide the data for each report. As a simple example of the function of the statistics engine 216, assume a report of the number of packet transmitted by each port unit that went missing (i.e. were not received by any other port unit) has been requested. To provide this report, the statistics engine 216 may request a total number of packets transmitted from each traffic generator, and a number of packets received by each traffic receiver sorted by transmitting port unit. The statistics engine 216 may then aggregate the number of received packets for each transmitting port unit by summing across the receiving port units. Finally, the statistics engine 216 may determine the number of missing packets for each transmitting port unit by subtracting a total number of packets transmitted and received by some receiving port unit from the total number of packet transmitted by the transmitting port unit. The statistics engine 216 may then provide the report manager 212 with a list of a number of missing packets for each transmitting port unit.

The report manager 212 may organize data received from the statistics engine into reports for presentation to the user via the graphical user interface 214 and the user I/O hardware 215.

The graphical user interface 214 may be configured to present information and receive user inputs via the user I/O hardware 215. The graphical user interface 214 may generate display screens for presentation on a display device within the user I/O hardware 215. The graphical user interface 214 may generate display screens to assist a test engineer or other user in monitoring and controlling a test session. By displaying virtual buttons, links, lists, and other graphical objects, the graphical user interface 214 may solicit and accept user inputs including report requests. The graphical user interface 214 may generate display screens presenting test results during or after a test session. The graphical user interface may generate a unique display screen for each report managed by the report manager 212, or may combine two or more reports into a single display screen. For example, the graphical user interface 214 may create display screens presenting each report in tabular form. Each column of a tabular display may represent a particular test statistic (e.g. number of packets, number of errors, latency time, etc.) and each row may represent a category (e.g. source or destination port, source or destination address, protocol type, etc.).

To provide near-real time reporting, requested reports may be updated at periodic intervals, such as every few seconds. To update a report, the statistics engine 216 must acquire new test statistics from the port units and aggregate the statistics to provide data to the report manager to format into reports. The test administrator may perform these actions periodically for all requested reports, even though only a portion of the requested reports may actually be displayed to the user at any given time. However, there may be a practical limit to the number and type of reports that can be updated concurrently. For example, the total number of statistics that can be received from the port units may be constrained by the bandwidth of the communication path 225, or the amount of data that can be aggregated and formatted into reports may be constrained by the computational power available in the test administrator. Requesting an excessive number of reports or excessively complex reports may result in improper operation of the test system, such as a slow or unresponsive graphic user interface, reporting partially or wholly incorrect data, or a system crash.

To avoid problems that may occur due to excessive reporting, the report manager may include a statistics guardrail 218. In transportation, a "guardrail" is a mechanical structure that prevents a vehicle from leaving the road or a train from leaving its track. The "statistics guardrail" 218 is a function that prevents the reporting process from "coming off track" by limiting the total number of statistics to be reported.

The statistics guardrail 218 may maintain an estimate of a present statistics load in the form of at least one present statistics load counts. A statistics load count may be a numerical value representing a cumulative number of test statistics that are retrieved and processed for the reports that are presently generated in near-real time. The statistics guardrail 218 may maintain present statistics load counts for different categories of statistics. For example, the statistics guardrail may maintain a protocol statistics load count for protocol related statistics retrieved from the Cstat memories of port units, and a traffic statistics load count for traffic statistics retrieved from the Tstat and Rstat memories of port units.

As discussed in the subsequent description of processes, when a new user report request is received by the report manager 212 via the graphical user interface 214 and the user I/O hardware 215, the statistic guardrail function may be invoked to ensure that the requested report is within the capabilities of the test system.

Figure 3:
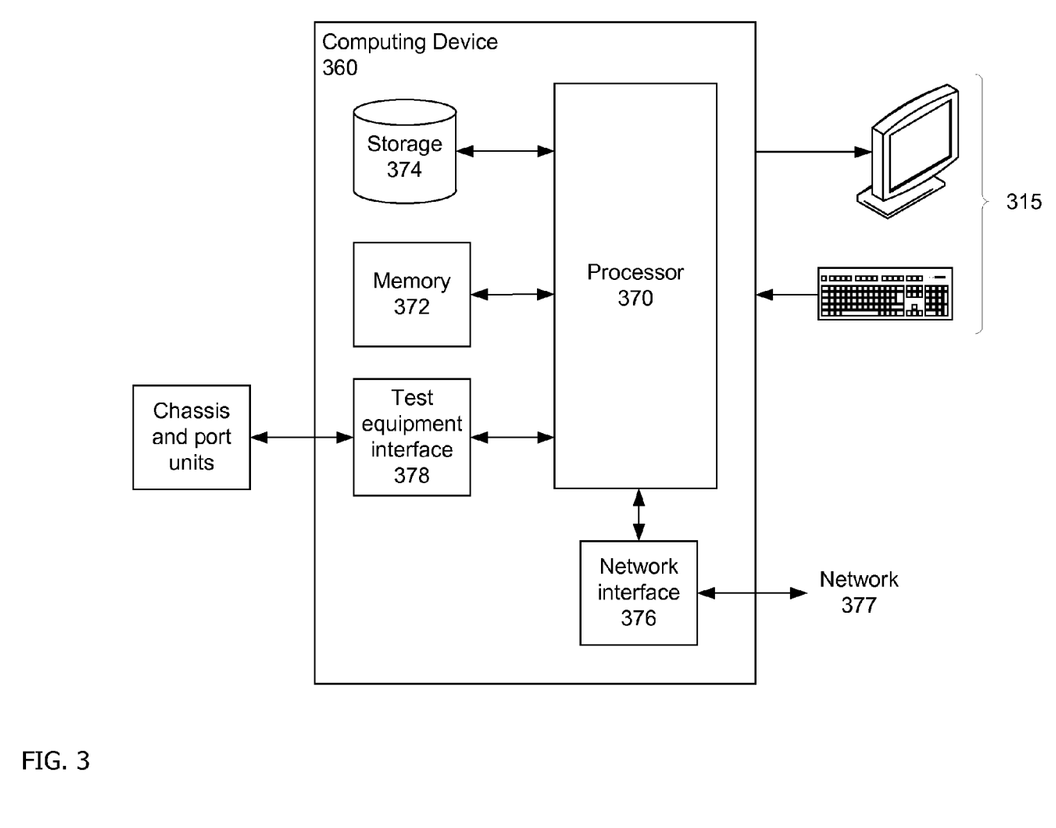
FIG. 3 is a block diagram of a computing device.

Referring now to FIG. 3, a computing device 310, which may be the test administrator 210, may include at least one processor 370 coupled to a memory 372. The processor 370 may be a single processor, multiple processors, or multiple processor cores within one or more processor circuit devices. The memory 372 may be static and/or dynamic random access memory or a combination of random access memory and other memory such as nonvolatile writable memory and read only memory. The memory 372 may temporarily or permanently store software instructions for execution by the processor 370 and data for use during the execution of those instructions.

The processor 370 may be coupled to a network 377, which may be or include the Internet, via a network interface 376. The processor 370 may be coupled to user I/O hardware 315, which may include, for example, a display and a keyboard and other devices that are not shown. The processor 370 may be configured to communicate with test equipment, such as the chassis 102 and network cards 106, via a test equipment interface 378.

The computing device 310 may execute an operating system, including, for example, variations of the Linux, Microsoft Windows, Symbian, and Apple Mac operating systems. To access the Internet, the client computer may run a browser such as Microsoft Explorer or Mozilla Firefox, and an e-mail program such as Microsoft Outlook or Lotus Notes. The computing device 310 may execute one or more application programs to perform the actions and methods described herein.

The operating system and/or application programs may be stored in the form of instructions on a machine readable storage medium within a storage device 374 coupled to the processor 370. Machine readable storage media include, for example, magnetic media such as hard disks, floppy disks and tape; optical media such as compact disks (CD-ROM and CD-RW) and digital versatile disks (DVD and DVD±RW); flash memory cards; and other storage media. Within this patent, the term "storage medium" refers to a physical object capable of storing data and does not encompass transitory media, such as propagating signals or waveforms.

Description of Processes

Figure 4:
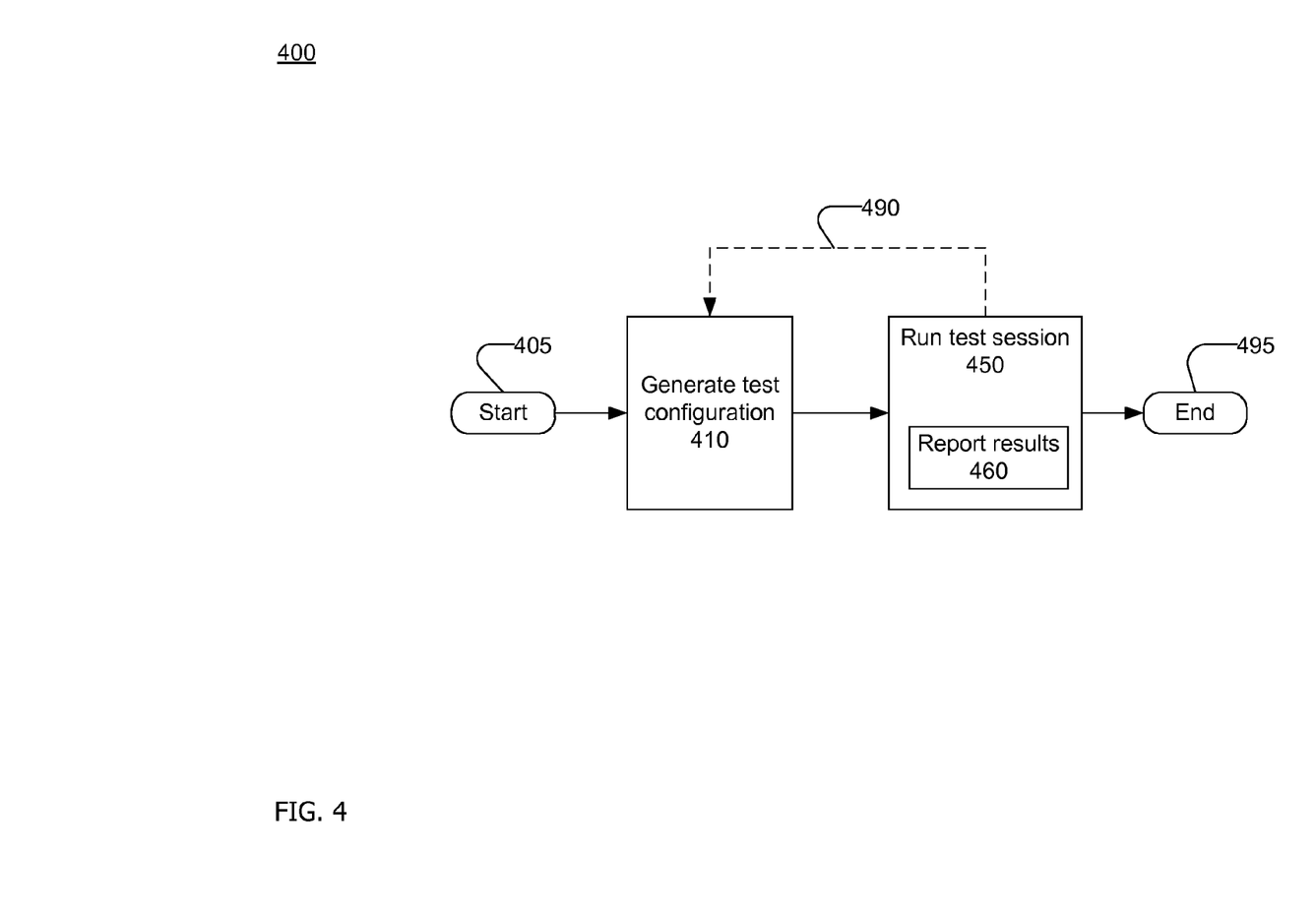
FIG. 4 is a flow chart of a process for testing a NUT.

Referring now to FIG. 4, a process 400 for testing a NUT may start at 405 and finish at 495. The process 400 may be executed within a test environment such as that shown in FIG. 1. The process 400 may be performed using a test administrator 210 in conjunction with a plurality of port units 220.

The process 400 may be used to test a network such as the network 190 and/or a network device such as the network device 192.

The process 400 may include generating a test configuration at 410 and running a test session according to the test configuration at 450. Interim test results may be reported at 460 while running the test session. The process 400 may also include archiving test data for future analysis and reporting post-test results, which are not shown in FIG. 4. The process 400 may be, to at least some extent, cyclic. For example, interim test results reported at 460 may be used to modify the test configuration, either automatically or as a result of some user action, as indicated by dashed line 490.

The first step in testing a NUT is to generate a test configuration at 410. A "test configuration" is a data set that defines both a test system and a test procedure to be used to test the NUT. A test configuration may include, for example, data defining the number and types of port units that will be connected to the NUT, the attributes and capabilities of each port, the protocols to be executed by each port, the traffic to be generated by each port, and the test data to be acquired during the test.

Generating a test configuration at 410 may include defining a plurality of ports to be used to test the NUT. Each port may be defined by a set of port attributes describing the hardware and physical layer configuration of the port. Port attributes may include, for each port, identification of the hardware used to implement the port, the physical layer protocol implemented by the port, parameters to be used by the port, and other data.

A port unit, such as the port unit 220, may include hardware and software for 50 or more different protocols for data communications, security, network control, and routing. Depending on the nature of the tests to be performed during a test session, each port may typically use only a portion of the total number of protocols within its capability. Generating a test configuration at 410 may include defining a subset of the available protocols that will be active at each port.

Generating a test configuration at 410 may also include defining the traffic to be generated by the ports while testing the NUT. The test traffic and the data used to define the test traffic may depend on the type of network or device to be tested. For example, test traffic may be defined at 440 in terms of IP datagrams, TCP connections, application layer transaction (e.g. HTTP Put and Get transactions), or emulated user activities, each of which causes some traffic to be generated and transmitted via the NUT.

After the test configuration is defined at 410, a test session may be run at 450. Running the test session at 450 may include assembly the test equipment implementing the ports defining in the test configuration, connecting the ports to the NUT, and using the test equipment to generate, transmit, receive, and analyze network traffic as defined in the test configuration.

Running the test session at 450 may also include reporting test results in near-real time at 460. Reporting test results in near-real time may include updating one or more requested report at period intervals.

Figure 5:
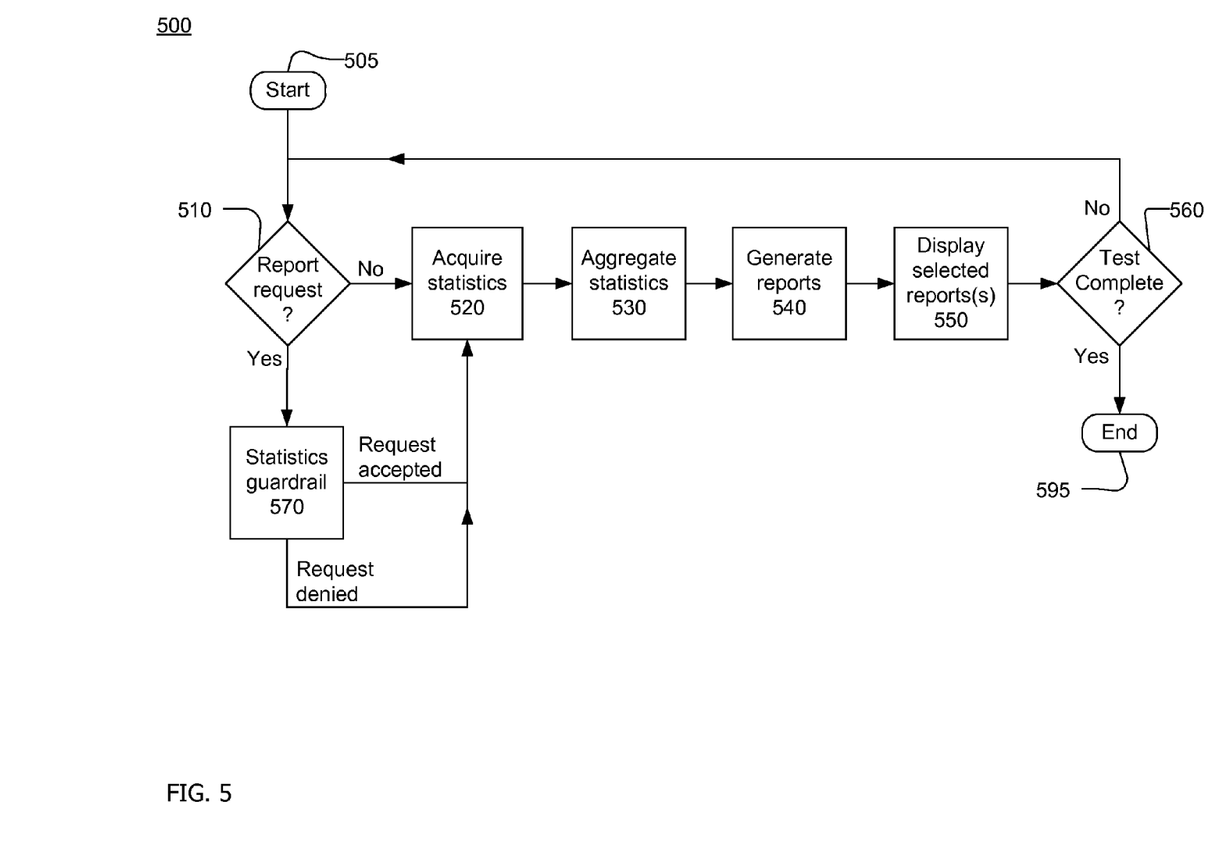
FIG. 5 is a flow chart of a process for near-real time reporting of test results.

Referring now to FIG. 5, a process 500 for reporting test results in near-real time may start at 505, which may be coincident with the start of a test session, and may end at 595 when the test session has been completed. The process 500 is cyclic in nature and the actions from 510 to 560 may be repeated at periodic intervals such as every few seconds.

The process 500 may be performed by a report manager operating in conjunction with a statistics engine and a graphical user interface on a computing device. The process 500 may be performed, for example, by the report manager 212, the graphical user interface 214, and the statistics engine 216 operating on the test administrator 210 of FIG. 2.

At 510, a determination may be made whether or not a report request has been received from a user via the graphical user interface. A report request may be a request to add a new report, to cancel a previously requested report, or to modify a previously requested report by increasing (i.e. adding rows or columns of data) or decreasing the amount of data contained in the report. When a report request has not been received, test statistics may be acquired from one or more port units at 520 and aggregated into reportable data at 530. The data may be formed into reports at 540, and one or more reports may be display via the graphic user interface at 550.

At 560, a determination may be made whether or not the test session has been completed. When the test session is complete, the process 500 may end at 595. When the test session is not complete, the process 500 may return to 510 to repeat during the next periodic time interval.

When a determination is made at 510 that a report request has been received, a statistics guardrail process may be executed at 570. The statistics guardrail process 570 may determine that the report request is within the present capability of the test system, in which case the report request may be accepted and fulfilled. In this context, "fulfilled" means taking the necessary steps to generate the requested report in near-real time. Alternatively, the statistics guardrail process 570 may determine that the report request, in combination with other previously requested reports and/or the testing process itself, exceeds the capability of the test system, in which case the report request may be denied.

Although shown in FIG. 5 as a sequence of serial actions for ease of description, the process 500 may be performed in a pipeline manner, such that the actions at 520, 530, 540, and/or 550 may be perform at least partially in parallel. Additionally, a report request may be received and the statistics guardrail process 570 performed at any point in the process 500.

Figure 6:
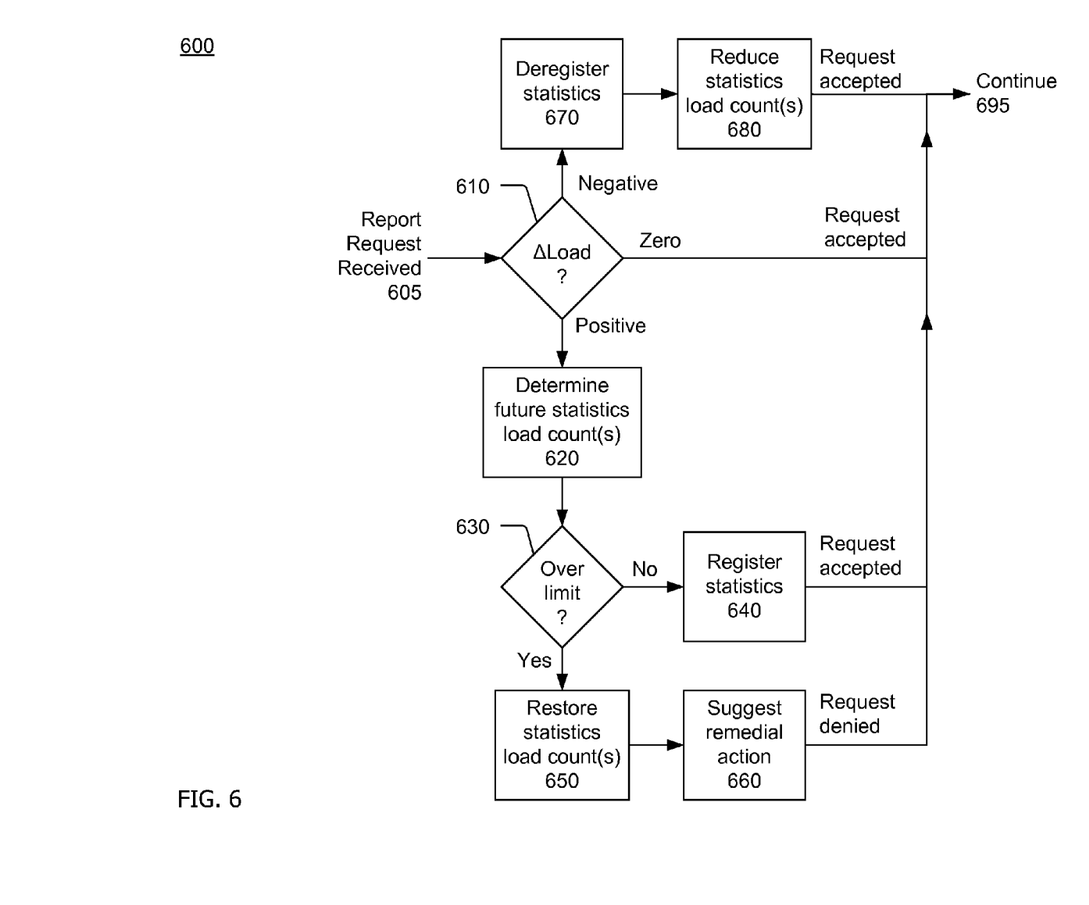
FIG. 6 is a flow chart of a statistics guardrail process.

Referring now to FIG. 6, a statistics guardrail process 600 may be suitable for use at 570 in the process 500. The statistics guardrail process 600 may start at 605, when a report request has been received, and may end at 695 when the process 500 is continued after the report request has been either accepted or denied. The statistics guardrail process 600 may be performed by a statistic guardrail function operating within a report manager on a test administrator computing device, such as the test administrator 210 of FIG. 2.

At 610, an incremental statistics load (ALoad) of the newly received report request may be determined. "Incremental statistics load" means the net change in the amount of test statistics that must be retrieved from port units and processed to provide the requested report. The incremental statistics load determined at 610 may be positive when the report request defines a new report. The incremental statistics load may also be positive if the report request increases the amount of data presented in an existing report, for example by increasing the number of rows or columns in a tabular report. The incremental statistics load may be negative if the report request cancels an existing report or reduces the amount of data presented in an existing report. In some cases, for example when a report request specifies a different reporting format for data already included in other reports, the incremental statistics load may be near or equal to zero.

The statistics guardrail process 600 may maintain one or more present statistics load counts representing the number of statistics required for all of the reports presently being generated. For example, the statistics guardrail process 600 may maintain a count of the total number of statistics values retrieved from the port units during each cycle through the process 500 of FIG. 5. The statistics guardrail process 600 may maintain a plurality of statistics load counts for different categories of statistics (e.g. transmit statistics, receive statistics, protocol statistics, traffic statistics, etc). The statistics guardrail process 600 may also maintain a count of the number of reports presently being generated. A different predetermined limit or maximum value may be associated with each present statistics load count. The predetermined limits may be preprogrammed in the test system or may be user defined as part of establishing a test configuration. The predetermined limits may be a combination of system-defined and user defined limits.

When a determination is made at 610 that the incremental statistics load for a newly received report request is positive, the incremental statistic load of the requested report may be added to the appropriate statistics load count values at 620. The result of the addition at 620 may represent an estimate of a future statistics load if the newly received report request is accepted.

At 630, a determination may be made if one or more of the future statistics load counts from 630 exceed the associated predetermined limit. If one or more of the future statistics load counts from 630 exceed the respective limit, the newly received report request may be denied. In this event, the statistics load counts may be restored to the previous present statistics load count values at 650. Optionally remedial action may be suggested to the user at 660. The suggested remedial action may, for example, provide an indication of the current values of the statistics load counts relative to the respective limits. The suggested remedial action may, for further example, propose reports that could be cancelled in order to accommodate the newly received report request or suggest a similar report that may be generated within the respective limits.

Alternatively, a determination maybe made at 630 that the addition of the newly request report will not cause any of the future statistics load counts to exceed the respective limits. In this event, the newly receive report request may be accepted and the statistics required for the new report may be registered with the statistics engine at 640 such that the new report may be fulfilled by the process 500 of FIG. 5.

When a determination is made at 610 that the incremental statistics load for a newly received report request is negative or zero, the report request may be accepted. When the incremental statistics load is negative, the statistics that are no longer required (due to cancellation or simplification of an existing report) may be deregistered with the statistic engine at 670, and the appropriate statistic load counts may be reduced accordingly at 680.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A report manager for a network test system, comprising:
a computer readable storage medium storing instructions that, when executed, cause a computing device to perform a report manager process, comprising:
maintaining at least one present statistic load count representing a cumulative number of test statistics required to generate one or more reports in near-real time;
receiving a report request from a user;
determining an incremental statistics load associated with the report request;
determining, based on the at least one present statistics load count and the incremental statistic load, whether or not the report request can be fulfilled;
when the report cannot be fulfilled, providing a message denying the report request to the user;
when the report request can be fulfilled, adding the incremental statistics load to the present statistics load count and fulfilling the report request.

2. The report manager of claim 1, wherein determining whether or not the report request can be fulfilled further comprises:
determining at least one future statistics load count based on the present statistics load count and the incremental statistics load;
determining that the report request can be fulfilled if all of the one or more future statistics load counts do not exceed respective predetermined limits; and
determining that the report request cannot be fulfilled if any of the one or more future statistics load counts exceed the respective predetermined limits.

3. The report manager of claim 1, wherein the at least one statistics load count comprises a plurality of statistics load counts associated with different categories of test statistics.

4. The report manager of claim 1, wherein the incremental statistics load represents a net decrease or increase in the cumulative number of test statistics resulting from the report request.

5. The report manager of claim 1, further comprising:
a storage device comprising the computer readable storage medium;
a processor and memory coupled to the coupled to the storage device and configured to execute the stored instructions.

6. A method for managing reports in a network test system, comprising:

maintaining at least one present statistic load count representing a cumulative number of test statistics required to generate one or more reports in near-real time;

receiving a report request from a user;

determining an incremental statistics load associated with the report request;

determining, based on the at least one present statistics load count and the incremental statistic load, whether or not the report request can be fulfilled;

when the report cannot be fulfilled, providing a message denying the report request to the user;

when the report request can be fulfilled, adding the incremental statistics load to the present statistics load count and fulfilling the report request.

7. The method of claim 6, wherein determining whether or not the report request can be fulfilled further comprises:

determining at least one future statistics load count based on the present statistics load count and the incremental statistics load;

determining that the report request can be fulfilled if all of the one or more future statistics load counts do not exceed respective predetermined limits; and determining that the report request cannot be fulfilled if any of the one or more future statistics load counts exceed the respective predetermined limits.

8. The method of claim 6, wherein the at least one statistics load count comprises a plurality of statistics load counts associated with different categories of test statistics.

9. The method of claim 6, wherein the incremental statistics load represents a net decrease or increase in the cumulative number of test statistics resulting from the report request.

* * * * *